Figure 1:
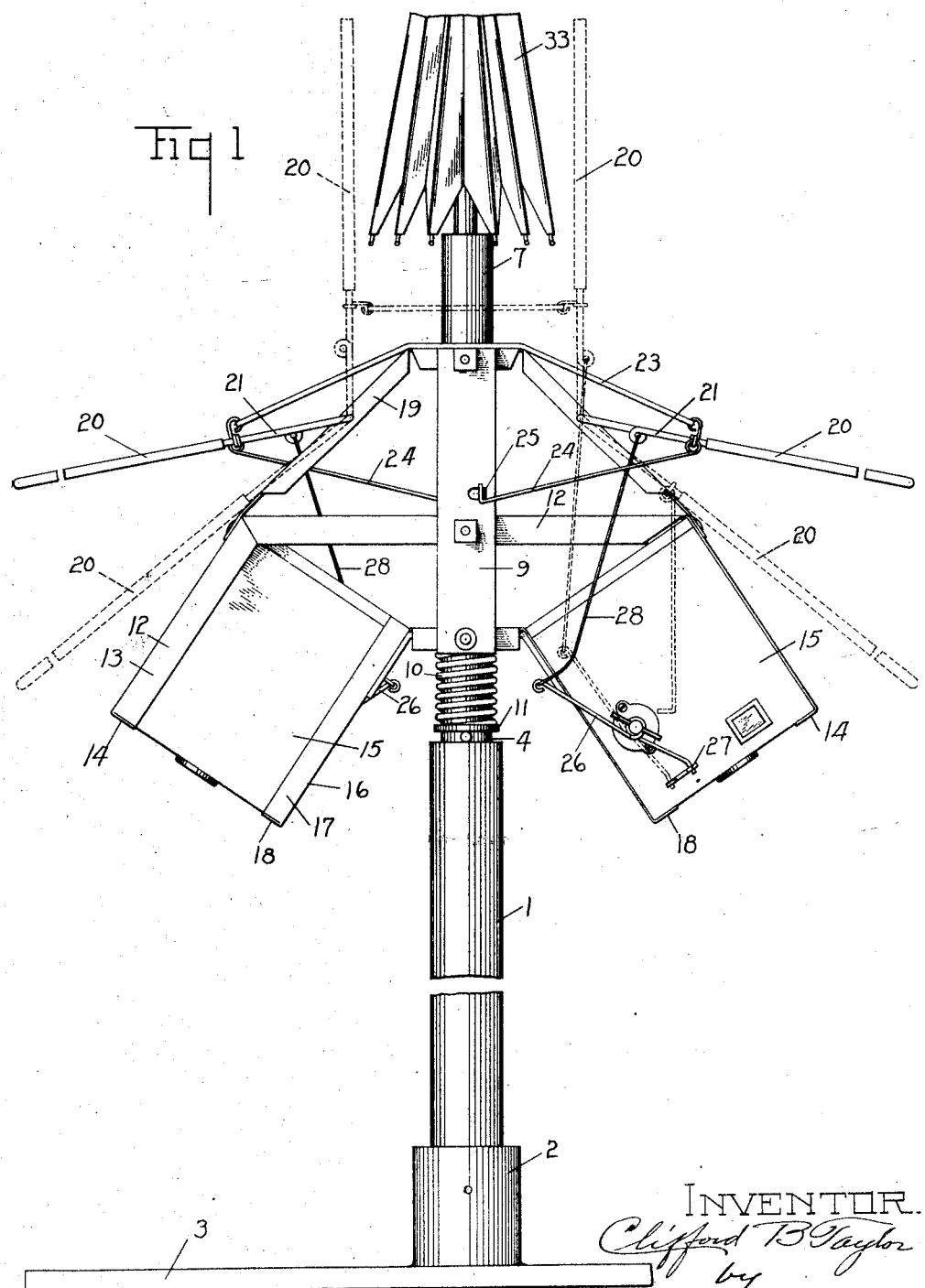

April 15, 1924.

C. B. TAYLOR

AERIAL PHOTOGRAPHIC APPARATUS

Filed Feb. 2, 1923

1,490,239

2 Sheets-Sheet 1

INVENTOR.
Clifford B Taylor
by
Owen Owen Crampton

April 15, 1924. 1,490,239
C. B. TAYLOR
AERIAL PHOTOGRAPHIC APPARATUS
Filed Feb. 2, 1923 2 Sheets-Sheet 2
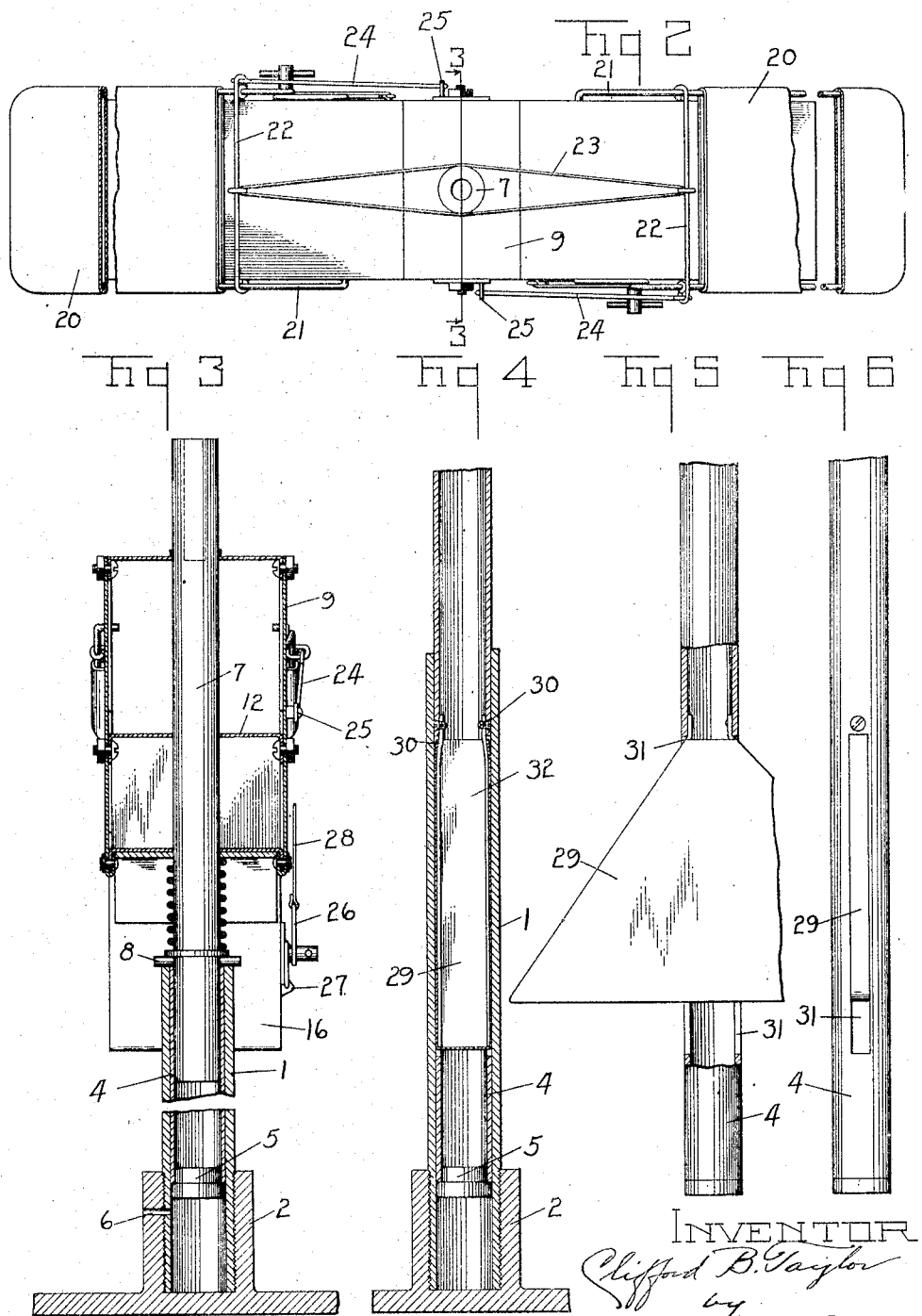

Patented Apr. 15, 1924.

1,490,239

UNITED STATES PATENT OFFICE.

CLIFFORD B. TAYLOR, OF ARCADIA, OHIO.

AERIAL PHOTOGRAPHIC APPARATUS.

Application filed February 2, 1923. Serial No. 616,481.

*To all whom it may concern:*

Be it known that I, CLIFFORD B. TAYLOR, a citizen of the United States, and a resident of Arcadia, in the county of Hancock and State of Ohio, have made an Invention Appertaining to an Aerial Photographic Apparatus, which invention is fully set forth in the following specification.

My invention has for its object to provide a photographic apparatus wherein the camera may be raised continuously in the air and upon the cessation of its upward movement the shutter will be opened and closed to take a picture. The invention is particularly of value in obtaining pictures of bird's-eye views.

The invention provides a means for continuously raising the camera until it has reached the desired position and also means controlled by the change in the pressure of air for operating the shutter mechanism of the camera when the camera comes substantially to a state of rest in its flight. The invention particularly has for its object to provide a means for throwing or shooting the camera into the air, means for maintaining it in the proper position with reference to the area that it is desired to photograph, and means for enabling its return without injury to the camera. The invention consists in other features and advantages which will appear from the following description and upon examination of the drawings that illustrate an embodiment of the invention.

The invention may be contained in structures of different forms. To illustrate a practical application of the invention I have selected a structure containing the invention and shall describe it hereinafter. The structure selected is illustrated in the accompanying drawings.

Figure 1 of the drawings illustrates a side view of the apparatus. Fig. 2 illustrates a top view. Fig. 3 illustrates a sectional view taken on the line 3—3 indicated in Fig. 2. Fig. 4 illustrates a sectional view showing a winged expansible tail that coacts particularly with reference to the center of gravity of the part of the apparatus that carries the camera in its flight. Fig. 5 illustrates the winged tail expanded. Fig. 6 is a side view of the part illustrated in Fig. 5 showing an edge view of the tail.

In the structure selected for purposes of illustration the part of the apparatus that supports the camera is shot into the air by means of a light charge of an explosive mixture located in a relatively long tube formed of a material sufficiently strong to withstand the gaseous pressure produced by the expansion of the charge. In Figs. 1, 3 and 4 is shown a tubular member or barrel 1 having considerable relative length which may be an ordinary gas pipe, preferably, however, of smooth bore. The lower end of the pipe 1 is closed by means of a cap 2 which may be formed integral with the base 3 and of sufficient size to maintain the tube in its upright position notwithstanding the discharge of the explosive material. A tubular member 4 is closed by a suitable plug 5 and is placed in the tubular member 1. The inner diameter of the member 1 and the outer diameter of the member 4 are sufficiently different to permit free longitudinal movement of one relative to the other. The lower end of the member 4, that is, of the plug 5, extends to near the bottom of the member 1. A touch hole 6 is formed in the side of the member 1. It may extend through the cap 2 and is so located that a fuse or its equivalent may be placed thereon to ignite the charge that may be placed within the lower end of the member 1. A small amount of explosive, such as gun powder, is placed in the lower end of the member 1 and is touched off through the touch hole 6.

A light rod 7, preferably formed of wood, is secured in the upper end of the member 4 by means of the pin 8. The pin 8 is of a length sufficient to engage the upper end of the member 1 to properly position the lower end of the member 4 with reference to the tubular member or barrel 1. A frame 9 is located on the rod 7. The rod 7 extends through openings formed in the frame, the frame being movable along the rod 7. It is yieldingly held in position with reference to the member 4 by means of the spring 10 which is located intermediate the frame 9 and a washer 11 located at the end of the member 4 and so that when the rod 7 and the member 4 are shot into the air the shock that would otherwise be produced on the frame 9 is absorbed by the spring 10.

The frame 9 is so constructed as to support one or more cameras. The cameras may be located in any desired position in order to photograph the desired areas. In the form shown the cameras are pointed diagonally downward. Any number of cameras may be carried, such as 1, 2, 3, or 4, but preferably the number and the position of the cameras carried are such as to balance the part of the apparatus that is shot into the air, to maintain a center of gravity within the axis of the rod 7 and the member 4. In the form shown two cameras are carried by the frame 9 and are located on opposite sides of the rod 7. The frame 9 is provided with an angular sheet metal strip 12 that has the flanges 13 and 14. The flanges 13 extend along one side of the depending portion of the angular part 12 to engage an upper corner of each of the cameras 15, and the flanges 14 engage the outer ends of the cameras 15. The frame 9 is also provided with a flanged strip 16 that has the flanges 17 and 18. The flanges 17 engage the lower side edge of each camera and are located on the same side of the camera that the flange 13 is located, while the flanges 18 also engage the ends of the camera. The parts 16 and 12 being formed of sheet metal are somewhat elastic and may be so located with reference to each other that when the cameras are placed in position they will be sprung apart and thus the cameras will be frictionally held in position as against any lateral displacement of the cameras. The part 12 is braced by the member 19 that extends diagonally to the top of the frame 9. It produces a substantially diamond-shaped frame for supporting the cameras.

For operating the shutter lever of each camera to produce the exposure, means is located on the frame 9 that responds to the change in the pressure of the air that resists the upward flight of the supporting part of the cameras. A pair of wings 20 are pivotally supported on the part 19 of the frame 9. The wings 20 are of light weight and are formed of the oblong frames 21 across which light paper or cloth is stretched. The frames 21 are provided with rods 22 that extend across the frames and an elastic spring member or spring members, such as the elastic band 23, operates to yieldingly pull the rods 22, and consequently the outer ends of the wings, towards the rod 7. The elastic band 23 may interconnect the rods 22 and thus yieldingly pull the frames towards each other and cause them to take an upright position above the pivot points or axis of rotation of the frames. In order to temporarily position the wings 20 prior to the discharge of the part of the apparatus that supports the cameras rods 24 are pivotally connected to the frames 21 and ears 25 are struck up from the frame 9 that may be engaged by hooks formed on the ends of the rods 24. In order to form the hooks the ends of the rods 24 are preferably turned upward so that if the outer ends of the wings 20 are moved downward the rods 24 will disengage from the ears 25 and hang suspended from their points of connection with the frames 21. The rods 24 thus hold the wings 20 against the upward pull of the elastic spring member 23 and position the wings 20 at a slight angle to the member 19 of the frame and so that there may be induced sufficient movement of the wings 20 to release the rods 24 from the ears 25. This occurs when the cameras are started in their upward flight by the pressure of the air which moves the wings 20 downward relative to the cameras and holds them in that position until they reach the end of their upward movement. As soon as the air pressure ceases, that is, as soon as the cameras come to rest, the spring member or members 23 draw the outer ends of the wings towards the end of the rod 7 and the shutters of the cameras are operated.

The shutters of the cameras are operated by means of pivoted levers 26 that are pivotally connected to the cameras 15 by any suitable means. The levers 26 extend over or through holes formed in the shutter lever or finger piece 27 and so that upward pivotal movements of the levers 26 will operate the finger pieces or levers 27 to cause the shutters of the cameras to open and close to produce the desired exposures. Cords 28 are connected to the ends of the levers 26 and to the frames 21. The length of the cords 28 are such that the levers 26 will not be operated until the wings 20 are drawn upward after they have been unlatched from the engagement with the ears 25, which occurs when the cameras have reached the highest point in their flight and are substantially at rest.

In order to maintain the axis of the camera supporting part of the apparatus in the desired position during the flight a winged member or members may be connected to the part of the apparatus. In the form of the construction shown means may be provided that will co-act with the said part or relative location of its mass to maintain its axis in an upright position during its flight. If desired the part of the apparatus may be so designed that its center of gravity will be so positioned that this upright position will be fairly well maintained. In order to insure this upright position I have provided means that will co-act to produce it. A winged tail 29 is connected to the lower end of the member 4. It consists of a pair of spring strips 30 that extend through slots 31. The ends of the strips 30 are secured by means of screws 32 to the member 4 near the ends of the slots 31. Flexible sheet material of paper or cloth is connected to the strips 30 and is spread by the strips to form a substantially triangular shaped wing. In order that the member 4 may be placed in the barrel 1 the slots 31 are of a length to receive the strips 30 and so that the strips 30 and the flexible sheet material 32 may be placed within the member 4 and within the barrel 1 preparatory to the discharge of the camera supporting part of the apparatus. After the discharge the spring strips 31 will elastically spread the wing tail 28 when the lower end of the member 4 leaves the barrel 1.

In order to prevent a rapid return or fall of the camera supporting part of the apparatus, a parachute may be located on the upper end of the rod 7. The parachute may be in the form of an umbrella 33 which is closed or partially closed during the ascent, but on its descent it is caught by the air and thus the speed of the descent of the cameras is greatly reduced and so that the camera supporting part of the apparatus may be easily caught.

I claim:

1. In a photographic apparatus, a camera, means for moving the camera in the air, and means controlled by the pressure of the air produced in the flight of the camera for operating the shutter of the camera.

2. In a photographic apparatus, means for projecting the camera in the air, means controlled by the pressure of the air produced by the flight of the camera for operating the shutter of the camera.

3. In a photographic apparatus, means for producing the flight of the camera in the air, means operated by the pressure of the air due to the flight of the camera for operating the shutter of the camera, and winged means for guiding the camera in its flight.

4. In a photographic apparatus, a camera, a member connected to the camera and operated by gas pressure for projecting the camera in the air, and means controlled by the pressure of the air produced in the flight of the camera for operating the shutter of the camera.

5. In a photographic apparatus, a camera, a barrel for receiving an explosive mixture, a member connected to the camera for projecting the camera by the exploded gases of the mixture, and means controlled by the pressure of the air produced in the flight of the camera for operating the shutter of the camera.

6. In a photographic apparatus, a camera, means for moving the camera in the air, and vanes for operating the shutter mechanism of the camera according to the pressure of the air on the vanes.

7. In a photographic apparatus, a camera, means for moving the camera in the air, and spring actuated vanes for operating the shutter mechanism of the camera according to the pressure of the air on the vanes.

8. In a photographic apparatus, a camera, means for moving the camera in the air, and spring actuated vanes for operating the shutter mechanism of the camera when the air pressure on the vanes is reduced to normal.

9. In a photographic apparatus, a camera, means for moving the camera in the air, spring actuated vanes for operating the shutter mechanism of the camera according to the pressure of the air on the vanes, and a latch for securing the vanes and tripped by the pressure of the air on the vanes.

10. In a photographic apparatus, a camera, means for moving the camera in the air, spring actuated vanes for operating the shutter mechanism of the camera, and a latch for securing the vanes and tripped by the pressure of the air on the vanes.

11. In a photographic apparatus, a camera, means for moving the camera in the air, means controlled by the pressure of the air produced in the flight of the camera for operating the shutter of the camera, and a parachute for sustaining the camera in its descent.

12. In a photographic apparatus, means for projecting the camera in the air, means controlled by the pressure of the air produced by the flight of the camera for operating the shutter of the camera, and a parachute for sustaining the camera in its descent.

13. In a photographic apparatus, means for producing the flight of the camera in the air, means operated by the pressure of the air due to the flight of the camera for operating the shutter of the camera, winged means for guiding the camera in its flight, and a parachute for sustaining the camera in its descent.

14. In a photographic apparatus, a camera, means for projecting the camera in the air, spring actuated vanes for operating the shutter mechanism when the air pressure on the vanes is reduced to normal, a latch for securing the vanes and tripped by the pressure of the air on the vanes, and a parachute for sustaining the camera in the air.

In testimony whereof, I have hereunto signed my name to this specification.

CLIFFORD B. TAYLOR.